United States Patent
Mongoven (10) Patent No.: US 10,267,630 B2
(45) Date of Patent: Apr. 23, 2019

(54) VISUAL ALTIMETER FOR SKYDIVING

(71) Applicant: FREEFALL DATA SYSTEMS LLC, Lompoc, CA (US)

(72) Inventor: Casey Patrick Mongoven, Lompoc, CA (US)

(73) Assignee: FREEFALL DATA SYSTEMS LLC, Lompoc, CA (US)

( * ) Notice: Subject to any disclaimer, the term of this patent is extended or adjusted under 35 U.S.C. 154(b) by 0 days.

(21) Appl. No.: 15/918,698

(22) Filed: Mar. 12, 2018

(65) Prior Publication Data

US 2019/0063916 A1  Feb. 28, 2019

Related U.S. Application Data (60) Provisional application No. 62/551,112, filed on Aug. 28, 2017.

(51) Int. Cl.
| | | |
|---|---|---|
| *G08B 21/00* | (2006.01) | |
| *G01C 5/00* | (2006.01) | |
| *G08B 5/36* | (2006.01) | |

(52) U.S. Cl.
CPC ................... *G01C 5/00* (2013.01); *G08B 5/36* (2013.01)

(58) Field of Classification Search
CPC ................... G01C 5/00; G08B 5/36
See application file for complete search history.

(56) References Cited

U.S. PATENT DOCUMENTS

| | | | | |
|---|---|---|---|---|
| 4,753,514 A | * | 6/1988 | Kubik | G02C 9/04 351/158 |
| 4,869,575 A | * | 9/1989 | Kubik | G02C 7/14 345/8 |
| 5,003,300 A | * | 3/1991 | Wells | G02B 13/16 340/980 |
| 5,270,707 A | * | 12/1993 | Schulte | B64D 47/06 244/1 R |

(Continued)

OTHER PUBLICATIONS

Wikipedia, Color vision, website, retrieved from the internet at least as early as Mar. 1, 2018, URL:<https://en.wikipedia.org/wiki/Color_vision>.

(Continued)

*Primary Examiner* — Quang Pham
(74) *Attorney, Agent, or Firm* — Klein O'Neill & Singh LLP (57) ABSTRACT

An altitude display device is provided for use when skydiving. The altitude display device may include an altimeter operative to determine an altitude of the altimeter and to generate an altitude signal representative of the determined altitude. The altitude display device may additionally include a visual display in operative communication with the altimeter to receive the altitude signal, with the visual display emitting a visual display signal at a rate that is imperceptible to a human user, and having a color representative of the altitude signal. The visual display signal may be variable in color within a prescribed color range associated with a prescribed altitude range, such that a change in altitude within the prescribed altitude range, as determined (Continued)

by the altimeter, correlates to a change in color of the visual display signal emitted by the visual display within the prescribed color range.

17 Claims, 4 Drawing Sheets

(56) References Cited

U.S. PATENT DOCUMENTS

| | | | | |
|---|---|---|---|---|
| 5,383,633 | A * | 1/1995 | Ellestad | F21V 21/08 239/270 |
| 5,423,215 | A * | 6/1995 | Frankel | G01C 5/00 244/147 |
| 6,127,933 | A * | 10/2000 | Ohmura | H04M 1/72519 340/635 |
| 6,914,534 | B2 * | 7/2005 | Tanguay | G08B 5/38 340/286.05 |
| 6,934,633 | B1 * | 8/2005 | Gallagher | G01C 21/00 342/357.52 |
| 7,909,484 | B2 * | 3/2011 | Rubtsov | F41H 13/0087 340/573.1 |
| 8,140,197 | B2 | 3/2012 | Lapidot et al. | |
| 8,244,461 | B2 * | 8/2012 | Durrett | G01C 23/00 244/138 R |
| 8,643,568 | B2 * | 2/2014 | West | G02B 27/0176 345/8 |
| 9,377,627 | B2 * | 6/2016 | Watanabe | G02B 27/0176 |
| 9,749,451 | B2 * | 8/2017 | Hoellwarth | G02B 27/017 |
| 10,012,506 | B1 | 7/2018 | Monahan et al. | |
| 2003/0046025 | A1 * | 3/2003 | Jamieson | G01C 23/00 702/159 |
| 2006/0017654 | A1 * | 1/2006 | Romo | G06F 3/01 345/7 |
| 2010/0182507 | A1 * | 7/2010 | Haggis | G01D 7/005 348/570 |
| 2010/0204910 | A1 * | 8/2010 | Durrett | G01C 21/20 701/532 |
| 2010/0238161 | A1 | 9/2010 | Varga et al. | |
| 2011/0109236 | A1 * | 5/2011 | Zhurin | H05B 33/0842 315/209 R |
| 2012/0235902 | A1 * | 9/2012 | Eisenhardt | A42B 3/042 345/156 |
| 2012/0317706 | A1 * | 12/2012 | Lebel | F41H 1/08 2/422 |
| 2014/0000014 | A1 * | 1/2014 | Redpath | A42B 3/042 2/422 |
| 2015/0250247 | A1 * | 9/2015 | Beckers | A42B 3/0446 2/422 |
| 2015/0347637 | A1 * | 12/2015 | Blanchard | G06F 17/5004 703/1 |
| 2016/0009393 | A1 * | 1/2016 | Repp | B64D 1/22 701/34.4 |
| 2016/0085077 | A1 * | 3/2016 | Milea | G02B 27/0149 359/632 |
| 2016/0327794 | A1 * | 11/2016 | Jiao | G02B 27/0172 |
| 2017/0067605 | A1 * | 3/2017 | Kuo | F21L 4/027 |
| 2017/0127746 | A1 * | 5/2017 | Pietrzak | A42B 3/042 |
| 2017/0231486 | A1 * | 8/2017 | Bone | A61B 3/02 351/243 |
| 2017/0242097 | A1 * | 8/2017 | Wyatt | G01S 7/24 |
| 2018/0026462 | A1 * | 1/2018 | Von Novak, III | H04W 76/14 320/107 |

OTHER PUBLICATIONS

Bodeym, Skydive Altimeter for Wingsuit / Tracking, Thingiverse (website), published Jan. 12, 2015, URL:<https://www.thingiverse.com/thing:631637>.

John Swallow, Facebook (website), published Dec. 18, 2017, URL:<https://www.facebook.com/photo.php?fbid=10155634542730862&set=ecnf.673520861&type=3&theater>.

Tobias, Pictame (website), published Oct. 11, 2016, URL:<http://www.pictame.com/media/1358917300769811047_22306734>.

Johntikis, Tracking/wingsuit skydive altimeter, Thingiverse (website), published Nov. 5, 2017, URL:<https://www.thingiverse.com/thing:2627767>.

* cited by examiner

VISUAL ALTIMETER FOR SKYDIVING

CROSS-REFERENCE TO RELATED APPLICATIONS

This application claims the benefit of U.S. Provisional Application No. 62/551,112, filed Aug. 28, 2017, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a visual display device for use while skydiving, wherein the visual display device may be capable of emitting a continuously changing color in response to a change in altitude.

2. Description of the Related Art

An inherent issue commonly associated with skydiving is knowing when to deploy the parachute. Accordingly, there is a need in the art for an improved device and method that addresses this issue.

BRIEF SUMMARY

Various aspects of the present disclosure relate to an altitude display device for use in skydiving. The altitude display device may emit light at a color associated with a particular altitude. As a skydiver descends during a skydive, the color emitted by the altitude display device may change by sequencing through the colors of the rainbow, which may visually represent a change in altitude between an exit altitude from an aircraft and a parachute deployment altitude. The light may be emitted at a refresh rate that may be imperceptible to the human eye, such that the light may appear to continuously blend from one color to the next.

According to one embodiment, there may be provided an altitude display device for use when skydiving. The altitude display device may include an altimeter operative to determine an altitude of the altimeter and to generate an altitude signal representative of the determined altitude. The altitude display device may additionally include a visual display in operative communication with the altimeter to receive the altitude signal, with the visual display emitting a visual display signal at a refresh rate that is imperceptible to a human user and having a color representative of the altitude signal. The visual display signal may be variable in color within a prescribed color range associated with a prescribed altitude range, such that a change of altitude within the prescribed altitude range, as determined by the altimeter, correlates to a change of color of the visual display signal emitted by the visual display within the prescribed color range.

The altitude display device may include a shaft connected to the visual display and connectable to a helmet wearable by a user. The shaft may be flexible. The visual display may be positioned adjacent an end of the shaft.

The visual display may include at least one light emitting diode capable of emitting a range of colors. The visual display may emit the visual display signal at a refresh rate greater than 30 Hz.

The altitude display device may further include a microcontroller in operative communication with the altimeter and the visual display. The microcontroller may receive the altitude signal from the altimeter and may generate command signals for visual display based on the received altitude signal. The altitude display device may include a wireless circuit in communication with the microcontroller to facilitate wireless communication with a remote electronic device. The microcontroller may be operative to define at least one end of the prescribed altitude range based on a change in altitude as determined by the altimeter.

The prescribed altitude range may be associated with a lower boundary altitude. The visual display signal may be emitted at a first frequency when the determined altitude is above the lower boundary altitude. The visual display signal may be emitted at a second frequency lower than the first frequency when the determined altitude is below the lower boundary altitude.

The visual display may be operable in a first mode to generate the visual display signal having a color representative of the altitude signal, and in a second mode to generate the visual display signal having a color representative of a vertical descent speed.

According to another embodiment, there may be provided a method of displaying altitude information to a user. The method may include determining an altitude using an altimeter, and generating an altitude signal by the altimeter, with the altitude signal being representative of the determined altitude. The method may further include emitting a visual display signal by a visual display at a refresh rate imperceptible to a human user, with the visual display signal having a color representative of the altitude signal. The method may additionally comprise varying the color of the visual display signal within a prescribed color range associated with a prescribed altitude range, such that a change of altitude within the prescribed altitude range, as determined by the altimeter, correlates to a change of color of the visual display signal emitted by the visual display within the prescribed color range.

The method may include generating the visual display signal adjacent an end of a shaft connected to a helmet wearable by the user. The method may comprise generating the visual display signal by a light emitting diode capable of emitting a range of colors. The method may include emitting the visual display the visual display signal at a refresh rate greater than 30 Hz.

The method may additionally comprise the steps of receiving the altitude signal from the altimeter at a microcontroller, and generating, by the microcontroller, command signals for the visual display based on the received altitude signal.

The method may include the step of defining, by a microcontroller, at least one end of the prescribed altitude range based on a change in altitude as determined by the altimeter.

The prescribed altitude range may be associated with a lower boundary altitude, and the method may additionally include emitting the visual display signal by the visual display at a first frequency when the determined altitude is above the lower boundary altitude, and emitting the visual display signal by the visual display at a second frequency lower than the first frequency when the determined altitude is below the lower boundary altitude.

According to another embodiment, there may be provided an altitude display device for use when skydiving. The altitude display device may include an altimeter operative to determine an altitude of the altimeter and to generate an altitude signal representative of the determined altitude. A visual display may be in operative communication with the altimeter to receive the altitude signal. The visual display may emit a visual display signal at a refresh rate that is imperceptible to a human user and that transitions within a first color range when the altitude signal is representative of a first altitude range, and a second color range when the altitude signal is representative of a second altitude range.

The altitude display device may include a microcontroller in communication with the altimeter and the visual display. The microcontroller may generate command signals for the visual display. The microcontroller may be capable of receiving user input to define the first color range, the first altitude range, the second color range, and the second altitude range.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Referring now to the drawings wherein the showings are for purposes of illustrating a preferred embodiment of the present disclosure, and are not for purposes of limiting the same, there is depicted an altitude display device for use when skydiving. The altitude display device may include a light emitting diode (LED) that emits light having a color correlated to a particular altitude. Accordingly, while the user is skydiving and experiencing a continuous change in altitude, the color of the LED may continuously sequence through the colors of the rainbow. The change in color of the LED may appear to be continuous or uninterrupted to the skydiver by blending the color at a refresh rate that is imperceptible to the skydiver, e.g., greater than the average eye can detect, such as greater than 30-60 Hz.

The user may assign one particular color with an exit altitude from an aircraft, and another color with a parachute deployment altitude, and as such, the color emitted by the LED during descent may sequence through the colors of the rainbow from the exit altitude color to the parachute deployment color. The colors of the rainbow are well-known to almost everyone, and therefore, a skydiver may be able to track the change of color from the exit altitude color to the parachute deployment color. For instance, if the exit altitude color is blue and the parachute deployment color is red, a skydiver may anticipate that during descent, the LED will transition from blue to green, to yellow, to orange, and finally to red. Therefore, if after exiting the aircraft, the skydiver looks at the LED and sees that it is green, the skydiver will know he is closer to the exit altitude than the parachute deployment altitude, and that the time for initiating the parachute deployment process is not yet approaching. If the skydiver looks at the LED and sees that it is yellow, the skydiver may know that he is approximately halfway between the exit altitude and the parachute deployment altitude. If the skydiver looks at the LED and sees that the color is orange, the skydiver may know that the parachute deployment altitude is quickly approaching, and therefore, greater attention may be devoted toward ensuring the skydiver is ready for deployment. Finally, when the skydiver sees the LED transition to red, the skydiver will know that it is time to deploy the parachute. Accordingly, the color emitted by the LED may not only be useful for estimating the current altitude of the skydiver, but because of the familiarity with the sequence of colors, the color emitted by the LED may allow the skydiver to anticipate how much altitude and time is left before parachute deployment. Being able to anticipate the amount of altitude and time left in the jump may be very useful, as there is usually a brief window of approximately four seconds within which the skydiver needs to deploy the parachute. Anticipating the parachute deployment altitude helps to ensure the skydiver is ready for deployment. If the user was merely alerted to the parachute deployment altitude at the beginning of the brief four second window, the skydiver may not be able to execute all of the steps that may be required for parachute deployment within the brief window. For instance, if the skydiver blinks at the beginning of the four second window, the skydiver may miss the beginning of that window, and only be left with a smaller amount of time. As such, the continuous signal emitted by the LED and the familiarity of the color sequencing of the altitude display device may provide an easy to decipher, yet critically valuable, visual signal to the skydiver to enhance the performance and safety of the skydive.

Figure 1:
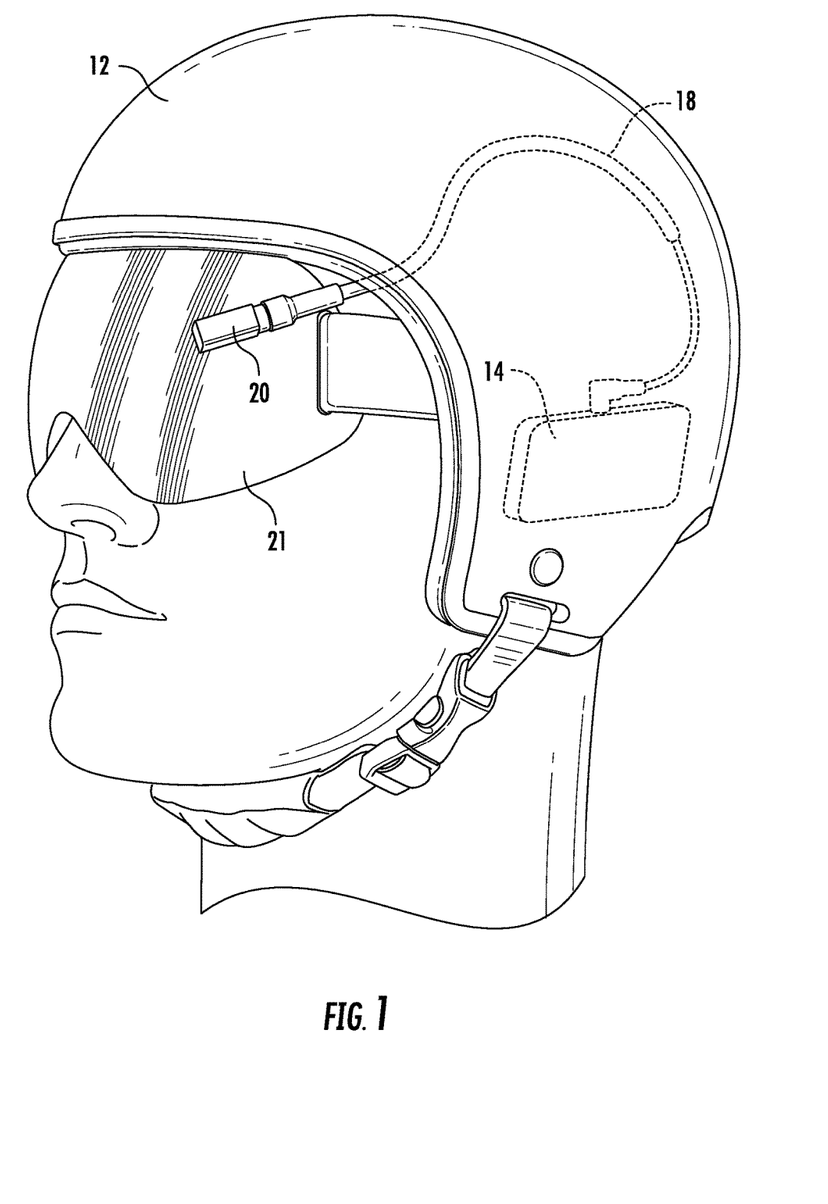
FIG. 1 is a perspective view of a skydiving helmet worn by a user, the skydiving helmet being fitted with an altitude display device according to an embodiment of the present disclosure.

Referring now specifically to FIG. 1, one embodiment of an altitude display device 10 is shown in use with a skydiving helmet 12 worn by a user. The altitude display device 10 generally includes a control unit 14, and a display unit 16 connectable to the control unit 14. The control unit 14 may include a housing 15 for several electronic components which implement various functionalities of the altitude display device 10, as described in more detail herein. The display unit 16 may include a flexible shaft 18 and a visual display 20 connected to a distal end of the flexible shaft 18 for providing a visual display signal to the user. The flexible shaft 18 is sized so as to extend outside of the helmet 12 to allow a user to position the visual display 20 in a location which may reside within a field of view of the user during use, with the visual display 20 remaining substantially stationary in the field of view during the skydive. The user may wear goggles 21 or other eyewear, and the visual display 20 may be positioned so as not to interfere with the fit and use of the goggles 21.

Figure 2:
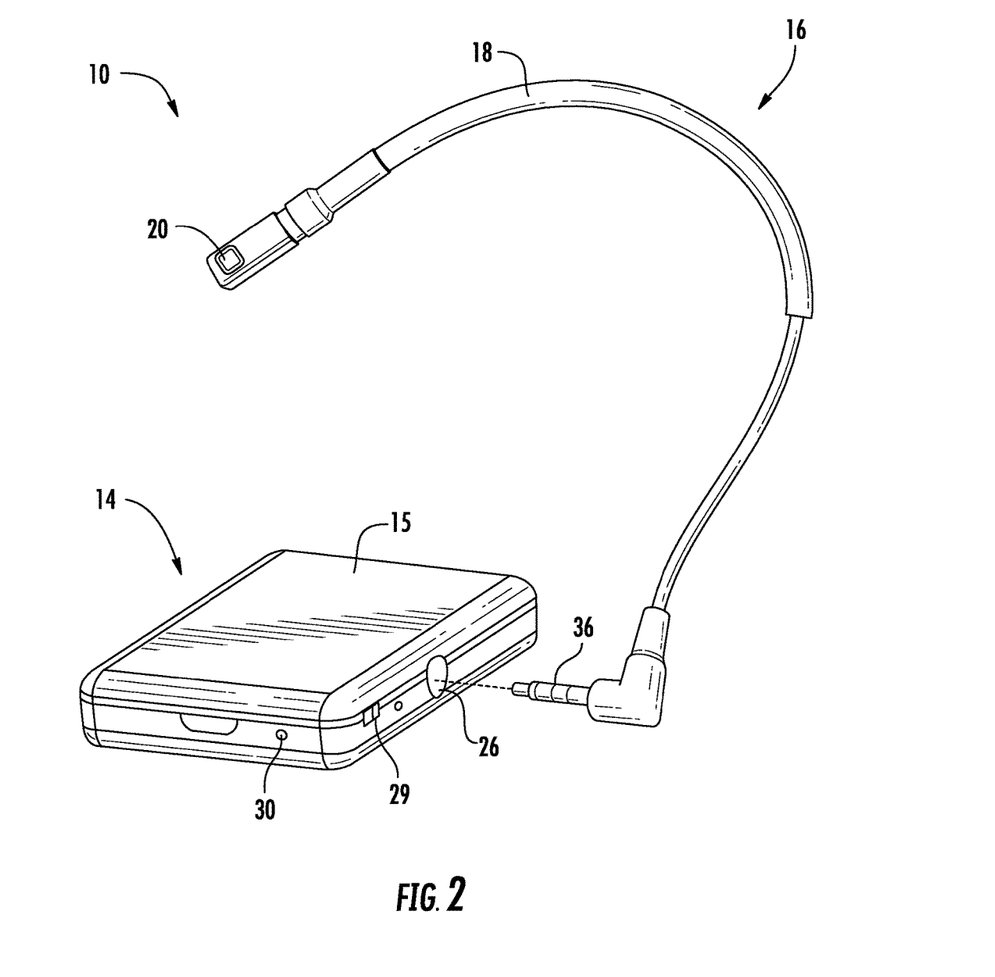
FIG. 2 is an upper perspective view of the altitude display device.
Figure 3:
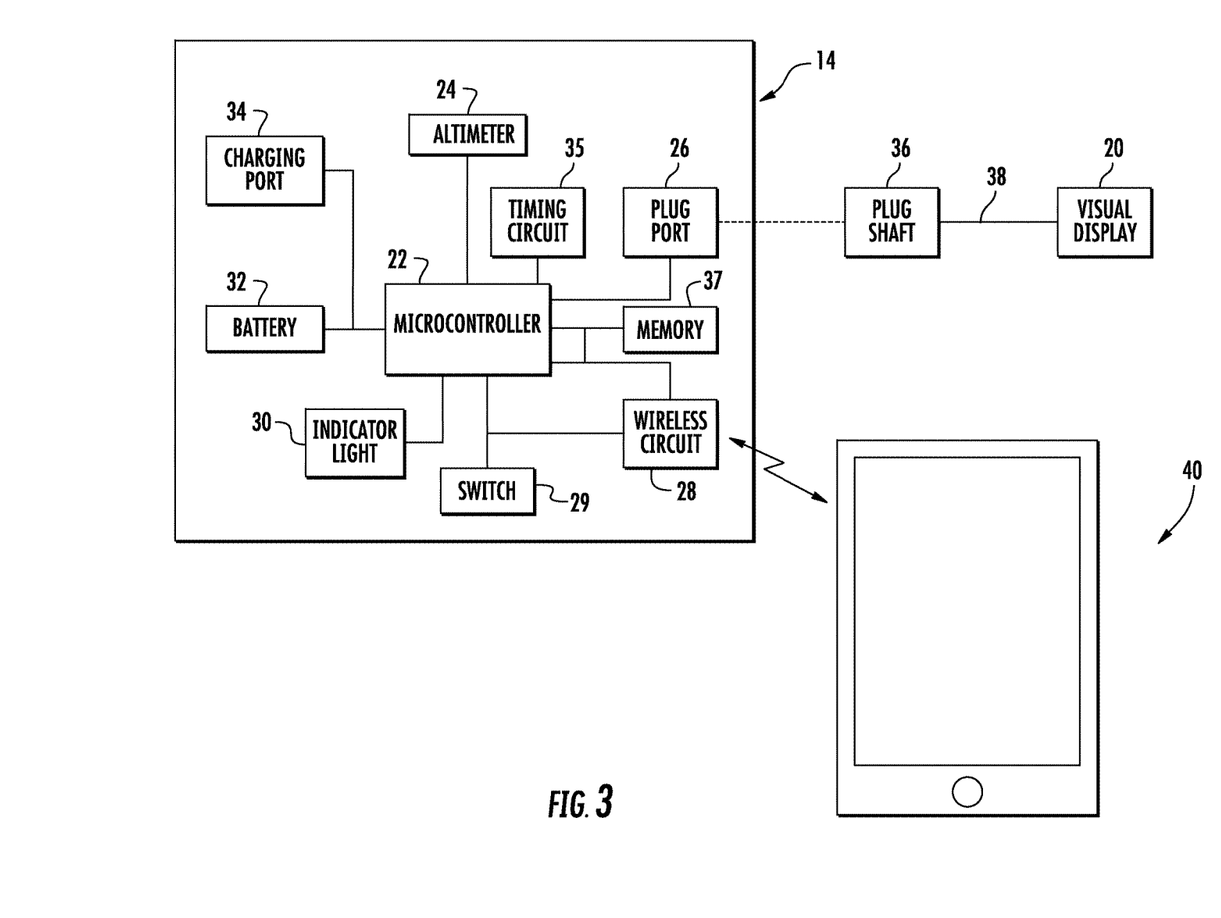
FIG. 3 is a schematic diagram of the electrical components in one embodiment of the altitude display device.

FIG. 2 shows the altitude display device 10 by itself, i.e., removed from the helmet 12, while FIG. 3 is a schematic diagram of the electrical components of one embodiment of the altitude display device 10. In FIG. 2, the display unit 16 is shown as being detached from the control unit 14. The electrical components of the control unit 14 may include a microcontroller 22, an altimeter 24, a plug port 26, a wireless circuit 28, an indicator light 30, a battery 32, a charging port 34, a timing circuit 35, and memory 37. The electrical components of the display unit 16 include a plug shaft 36 and the visual display 20. The functionality of the electrical components will be described in more detail below.

The altimeter 24 determines an altitude of the control unit 14, and thus, when the control unit 14 is worn by the user, the altimeter 24 determines the altitude of the user. The altitude may be determined by the altimeter 24 based on a measurement of atmospheric pressure, i.e., a barometric altimeter, wherein the greater the altitude, the lower the pressure, and vice versa. One example of a barometric altimeter is a BMP280 sold by Robert Bosch GmbH. The altimeter 24 may employ another technique currently known, such as the Global Positioning System (GPS), or later developed, for determining altitude without departing from the spirit and scope of the present disclosure.

The altimeter 24 may generate an electrical signal, e.g., an altitude signal, which is representative of the determined altitude. Since the altimeter 24 may continuously determine the altitude during all phases of a skydive, i.e., ascent, freefall, and canopy flight, the altitude signal may be continuously generated from the beginning of ascent to the end of canopy flight when the skydiver lands, so as to reflect the continuous change in altitude. In one embodiment, the continuous generation of the altitude signal may be associated with a sampling rate of 12.5 Hz, although in some instances, the sampling rate is greater than 12.5 Hz, such as 30-60 Hz, or perhaps, even greater than 60 Hz. It is also contemplated that the sampling rate of the altimeter 24 may be synchronized with the refresh rate of the visual display 20.

The altimeter 24 may be in electrical communication with the microcontroller 22. One example of a microcontroller 22 is an ATmega32u4 by Atmel Corporation. The microcontroller 22 may be configured to receive the altitude signal from the altimeter 24 and generate a command signal for the visual display 20 based on the received altitude signal. In this respect, the microcontroller 22 may be programmed to correlate the altitude associated with the received altitude signal with a specific color or hue that is to be generated by the visual display 20. Accordingly, the command signal generated by the microcontroller 22 includes instructions for the visual display 20 to be illuminated at the color frequency associated with the determined altitude.

The visual display 20 is operative to emit the visual display signal in response to receipt of the command signal from the microcontroller 22. Depending on the operational mode of the altitude display device 10, the visual display signal may be emitted at any time during the duration of any phase of the skydive, including ascent, freefall and canopy flight. The visual display 20 may include one or more light emitting diode(s), or other light emitting devices known in the art capable of emitting a range of colors. For instance, the visual display 20 may include an RGB LED mounted on a circuit board located at the end of the flexible shaft 18. The visual display 20 is preferably of a size and shape that is discernable to the user, without blocking a significant portion of the user's field of view. Furthermore, the shape of the visual display 20 may be quadrangular, circular, triangular, or any other shape known in the art.

The visual display 20 may receive the command signal from the control unit 14 via an electrical pathway that extends between the microcontroller 22 and the visual display 20. In particular, the microcontroller 22 may be in electrical communication with the plug port 26, which may be externally accessible on the housing 15 of the control unit 14. The plug port 26 may be sized to receive the plug shaft 36, which when inserted into the plug port 26 may be in electrical communication with the plug port 26 through direct contact therewith. The plug shaft 36 is in electrical communication with the visual display 20 through wires 38 extending through the flexible shaft 18.

The battery 32 may provide power to the various components of the control unit 14. The battery 32 may be rechargeable by connecting the charging port 34 to an external power source. The charging port 34 may include a micro-USB port, a USB port, or other ports known in the art. When the charging port 34 is connected to an external power supply, and the battery 32 is being recharged, the indicator light 30 may be illuminated. The indicator light 30 may be configured to illuminate one color (e.g., red) when the battery 32 is charging, and another color (e.g., green) when the battery 32 is fully charged.

The control unit 14 may be programmable to implement various functionalities, as will be described in more detail below. According to one embodiment, programming of the control unit 14 may be achieved through a wireless circuit 28, capable of wireless communication with a remote electronic device 40, such as a smartphone, tablet computer, laptop computer, desktop computer, or other electronic device. The wireless circuit 28 may be actuated via a switch 29 on the control unit 14. One example of a wireless circuit 28 that may be included in the control unit 14 is a Bluetooth® wireless technology module, model number MDBT40-256RV3 sold by Raytac Corporation. In addition to Bluetooth® communication protocol, the wireless circuit 28 may communicate wirelessly in other communication protocols, including but not limited to, Zigbee, RFID, WiFi, etc. Although the exemplary embodiment includes a wireless circuit 28, it is contemplated that in other embodiments, programming of the control unit 14 may be achieved through wired communication between the control unit 14 and a remote electronic device 40. As such, the control unit 14 may include a programming port which may be connected to the remote electronic device, either directly, or through an intervening cable. As another alternative, the control unit 14 may include a user interface with a touch screen, buttons, or the like, which allows a user to program the control unit 14.

Figure 4:
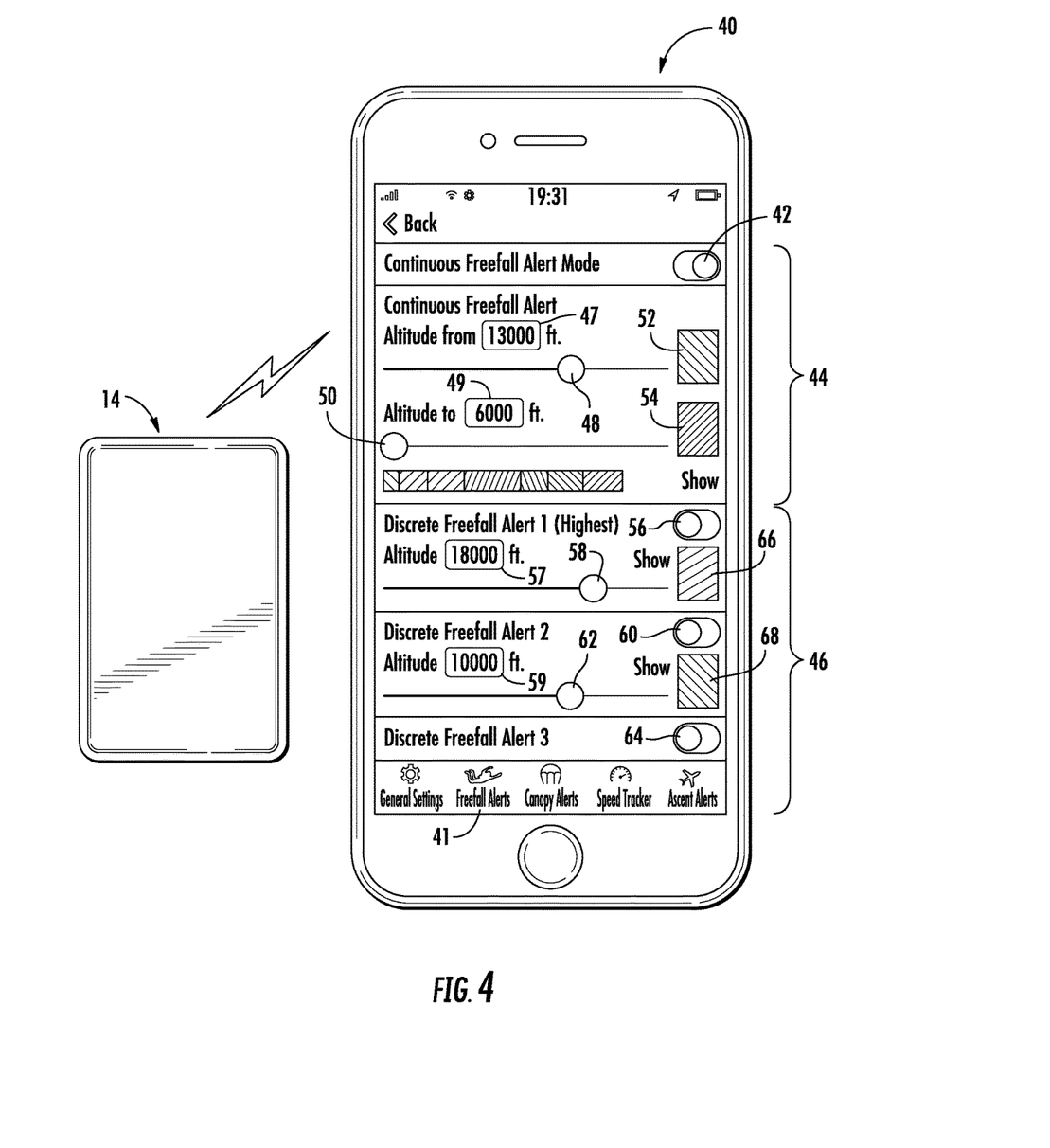
FIG. 4 is a plan view of a handheld electronic device in wireless communication with a control unit of the altitude display device.

Referring now specifically to FIG. 4, it is contemplated that when a remote electronic device 40 is used to program the control unit 14, an application ("app.") may run on the remote electronic device 40 to facilitate user input. FIG. 4 depicts a smartphone 40 displaying running an app, which allows the smartphone 40 to be used for programming the control unit 14. A programming menu is displayed on the touchscreen of the smartphone 40, with the programming menu providing several different operational modes for purposes of programming.

A first mode is associated with the FREEFALL ALERT button 41, which is related to the screenshot depicted on the smartphone 40 in FIG. 4. When the FREEFALL ALERT button 41 is pressed, a user can select CONTINUOUS FREEFALL ALERT MODE, or alternatively, a series of DISCRETE FREEFALL ALERTS. The CONTINUOUS FREEFALL ALERT MODE provides a visual alert between two altitudes, namely, an upper altitude and a lower altitude. The DISCRETE FREEFALL ALERTS are capable of providing visual alerts within a number of different altitude ranges.

The CONTINUOUS FREEFALL ALERT MODE may be used to vary the color emitted by the visual display 20 as the altitude varies between an upper altitude and a lower altitude. The color may sequence between two predetermined colors, which may be selected by the user. To actuate the CONTINUOUS FREEFALL ALERT MODE, button 42 is toggled to an ON position (which is the right-most position depicted in FIG. 4), which causes the programming options in field 44 of the touchscreen to illuminate, and thus, be programmable, whereas the programming options in field 46 become shaded, and are deactivated. The programming options in field 44 includes allowing the user to enter an altitude range associated with the CONTINUOUS FREEFALL ALERT MODE. An upper altitude of the altitude range may be programmed by entering a number into the text field 47. The lower altitude of the altitude range may be programmed by entering a number into the text field 49 in a similar manner.

The color range associated with CONTINUOUS FREEFALL ALERT MODE may also be programmed by selecting a first color associated with the upper altitude and a second color associated with the lower altitude. The first color is selected using slider 48, wherein the user may cycle through the colors of the rainbow and view a preview of the currently selected color in the window 52. The second color is selected using slider 50, wherein the user may cycle through the colors of the rainbow and view a preview of the currently selected color in the window 54. The first and second colors selected by the user may be any color along the color spectrum of the rainbow. It is known that the color sequence of the rainbow may be in the order of red, orange, yellow, green, blue, indigo, and violet (e.g., ROYGBIV). Thus, if the selected colors are red and violet, the visual display 20 may sequence through the entirety of the rainbow during a given jump. However, it is contemplated that the user may select any two colors along the spectrum. Should the user select two adjacent colors on the spectrum, during a given descent, the colors emitted by the visual display 20 may only vary along a small portion of the rainbow spectrum. For example, if a user selects yellow for the upper altitude and green for the lower altitude, the visual display 20 will vary between yellow and green during the descent. In that instance, red, orange, blue, indigo, and violet would not be emitted by the visual display 20.

After the first and second colors are selected, the microcontroller 22 can determine how quickly the color needs to sequence through the spectrum during use. This may be done by identifying the wavelengths associated with the selected first and second colors and a related wavelength differential therebetween. The rate of color change during use may be equal to the wavelength differential divided by the altitude differential. For instance, if the first color selected is red, the wavelength associated with red may be 665 nm, and if the second color selected is blue, the wavelength associated with blue may be 470 nm. As such, the wavelength differential may be equal to 195 nm (i.e., 665 nm-470 nm). Using the example shown in FIG. 4, wherein the upper altitude is 13000 ft. and the lower altitude is 6000 ft., the altitude differential is 7000 ft. (i.e., 13000 ft.-6000 ft.). Therefore, the rate at which the color changes on the visual display is approximately equal to 195 nm/7000 ft., or approximately equal to 2.78 nm/100 ft. These calculations can be conducted by the microcontroller 22 after the altitudes and colors are selected. Furthermore, as the altitude signal is received form the altimeter 24, the microcontroller 22 can vary the control signal for the visual display 20 as the altitude changes.

Although the above example refers to colors in terms of nanometers, it is contemplated that the colors may be referred to in other terms. For instance, the colors may be associated with respective hue values. Along these lines, it is common to assign a range of colors with a hue values ranging from 0-255. Therefore, the calculation for determining a rate of change of color may include determining a hue value differential and dividing that by the altitude differential.

With reference to FIG. 1, when a skydiver uses the altitude display device 10 in the CONTINUOUS FREEFALL ALERT MODE, the visual display 20 may be positioned in the peripheral view of the skydiver. Prior to the jump, the skydiver is aware of the altitude at which he needs to deploy the parachute. This altitude may be preprogrammed as the lower altitude and may be associated with a specific color, as described above. During ascent, the visual display 20 may transition from the second color to the first color, as the skydiver ascents from the lower altitude to the upper altitude. For instance, if the second color is red and the first color is blue, the visual display 20 may transition from red to orange to yellow to green and then to blue once the upper altitude is reached. During the jump, as the skydiver descends and experiences a continuous decrease in altitude, the altimeter 24 may continuously determine the real-time altitude of the skydiver. At the beginning of the jump, assuming the user jumps at or above the upper altitude, the color emitted by the visual display 20 may begin at the color associated with the highest programmed altitude. During the jump, the color emitted by the visual display 20 will appear to continuously blend from the color associated with the highest programmed altitude toward the color associated with the parachute deployment altitude. Continuing with the example of the colors of blue and red being associated with the upper and lower altitudes, respectively, the visual display 20 will appear to continuously blend from blue to green to yellow to orange and finally to red. The blending of colors refers to the visual display 20 making very small, incremental changes in color or hue, in response to very small changes in altitude. As such, the color changes are not large, stepwise changes, wherein the color only makes a handful of steps between the upper and lower altitude. Rather, there may be hundreds or even thousands of incremental colors emitted by the visual display between the selected upper and lower altitudes. For example, as the visual display 20 transitions between blue and red using the example from above, the visual display 20 will display several intermediate hues as the color changes from blue to green, and several intermediate hues as the color changes from green to yellow, and so forth.

Since the skydiver is aware of the preprogrammed colors, and where they may fall in the sequence of rainbow colors, as well as the preprogrammed altitudes, the skydiver can estimate his position between the jump altitude and the parachute deployment altitude based on the current color emitted by the visual display 20. For example, if blue is associated with the jump altitude and red is associated with the parachute deployment altitude, the skydiver may know the colors may sequence from blue to green to yellow to orange and then to red. Furthermore, the skydiver is able to anticipate how much altitude is left between the skydiver's current altitude and the parachute deployment altitude by comparing the real-time color emitted by the visual display 20 with the color associated with the parachute deployment altitude. If the skydiver knows the parachute deployment altitude is associated with the color red, and the visual display 20 is emitting an orange color, the skydiver may understand that he is rapidly approaching the parachute deployment altitude. Conversely, if the visual display 20 is emitting a green color, the skydiver may know that he is still in the beginning phase of the descent. In this regard, the altitude display device 10 may not simply provide an alert when the parachute deployment altitude is reached; rather, the altitude display device 10 may provide a continuously changing alert signal which may allow the user to approximate his current altitude, as well as estimate how quickly the parachute deployment altitude may be approaching.

While the foregoing describes the sequence of colors being similar to the sequence of colors in a rainbow, it is understood that the scope of the present disclosure is not limited thereto. For instance, the particular sequence of colors may be any color sequence desired by the user.

The apparent continuous blending of color as a result of a change in altitude may be attributable to at least three factors: 1) a refresh rate of the visual display 20, 2) an incremental size of color wavelength of light emitted by the visual display 20, and 3) a sampling rate of the altimeter 24. The refresh rate refers to the rate at which light emitted by the visual display 20 rapidly sequences between on and off. To achieve the perceived continuous on status of the visual display, the visual display 20 may emit the light at a refresh rate that is imperceptible to the user, e.g., the visual display 20 may flash or blink at a rate that may not be detectable by the human eye. In some embodiments this refresh rate may be between 30-90 Hz, and in one particular embodiment is approximately 60 Hz, meaning that the light will turn on 60 times in one second.

With regard to the incremental size of color wavelength of light emitted by the visual display 20, it is understood that in blue-green and yellow wavelengths, a human user may perceive a 1 nm change in wavelength, whereas in longer red and shorter blue wavelengths, a human user may perceive a 10 nm change in wavelength. Therefore, in one embodiment, the change in nanometers between blinks on the visual display 20 may be less than 1 nm, e.g., 0.9 nm. The sampling rate of the altimeter 24 may preferably be at a frequency such that the change in altitude at terminal velocity, e.g., 150-180 mph, does not result in a detected change in altitude between altitude data samples that correlates to a change in nanometers equal to or greater than 1 nm to 10 nm of color change. Preferably, that number would be 1 but could be greater such as 15 or even up to 20 nm.

In the preferred embodiment, the visual display 20 depicts a continuous blending of colors representative of a change in altitude. It is also contemplated that other embodiments may offer a perceptible step wise color change representative of the altitude. By way of example and not limitation, the sampling rate may be slowed down to about 1 or 2 Hz which may sample the altitude once or twice every second. Because of the high terminal velocity of the user and the rate at which the light will change based on the nanometer calculation discussed herein, the incremental size of the wavelength may be greater than the 1 or 10 nanometers depending on the color being depicted. Hence, during use, when the sampling rate is low, the visual display may blink multiple times displaying a wavelength representative of the last sampled altitude. When the altitude is sampled again, a different wavelength is emitted by the visual display. This difference, if more than 1 nm or 10 nm depending on the color being shown, may appear to be stepwise and not a continuous transition.

It is contemplated that in some embodiments the sampling rate may be between 0.5 Hz to 4 Hz. In this range, the refresh rate may be preferably greater than the sampling rate so that the most current sampled altitude is represented by the color depicted on the visual display. Although a low sample rate is contemplated, it is preferred that the sample rate and the refresh rate is sufficiently high to achieve a continuous change in color without a blinking effect of the visual display.

Turning now to the DISCRETE FREEFALL ALERTS mode, the DISCRETE FREEFALL MODE may be desirable when the skydiver wants to know when certain altitude thresholds are crossed during a skydive. In this respect, the user may select different color ranges to appear within discrete altitude ranges.

The DISCRETE FREEFALL MODE is actuated by moving button 42 to the off position (e.g., the left-most position in the position as shown in FIG. 4), which causes the options in field 44 to become shaded and not programmable, whereas the programming options located in field 46 become illuminated, and thus, are programmable. The options in field 46 allow a user to set several altitudes at which a defined visual alert or color is illuminated by the visual display 20. In this regard, as the user is falling the user will know when they cross specific altitude threshold(s) by virtue of the visual display 20 depicting the color associated with the specific altitude threshold. The user can program a first altitude alert by actuating a first alert button 56, which allows a user to set the first altitude alert by entering a number into text field 57. The user can program a second altitude alert by actuating a second alert button 60, which allows a user to set the second altitude by entering a number into text field 59. The user can program a third altitude alert by actuating a third alert button 64, and a third altitude text field can be accessed by pulling up the screen using conventional touch screen control finger gestures. The user can program a color for each discrete freefall alert by using sliders 58, 62 associated with the particular discrete freefall alert, and selecting the desired color from the colors of the rainbow. Previews of the currently selected colors associated with the first and second altitude alerts may be displayed in windows 66 and 68.

When skydiving in the DISCRETE FREEFALL MODE, the microcontroller 22 receives the altitude signal from the altimeter 24 and generates a control signal for the visual display 20 based on the programmed alert altitudes and the programmed colors. In one embodiment, the visual display 20 will emit a first color between the first altitude and the second altitude, a second color between the second altitude and the third altitude, and so forth. As such, the color may remain constant when the altitude is between two defined thresholds. In another embodiment, the visual display 20 may continuously transition the colors between the first color and the second color as the altitude changes from the first altitude and the second altitude, and transition the colors between the second color and the third color as the altitude changes from the second altitude to the third altitude and so forth. For instance, if the first color is red, the second color is violet, and the third color is yellow, the visual display 20 may blend from red to orange, to yellow, to green, to blue, to indigo, and finally to violet as the altitude changes from the first altitude to the second altitude. The colors may then blend from violet to indigo, to blue, to green, and then finally to yellow as the altitude changes from the second altitude to the third altitude.

In some instances, the altitude ranges may not be adjacent to one another. For instance, one range may be from 18000 ft. (e.g., first altitude) to 10000 ft. (e.g., second altitude), and then another range may be from 9999 ft. (e.g., third altitude) to 6000 ft. (e.g., fourth altitude). The colors associated with each altitude may be red (e.g., first color), green (e.g., second color), yellow (e.g., third color) and violet (e.g., fourth color). Therefore, as the user descends within the first range, the light emitted by the visual display 20 may blend from red to orange to yellow and then finally to green. As the user quickly transitions from the first altitude range, ending at 10000 ft., to the second altitude range, starting at 9999 ft., the visual display 20 may transition from green to yellow. This transition between altitude ranges may occur in several different ways. Any gap between altitude ranges may result in the visual display 20 either: 1) going dark; 2) remaining the color associated with the second altitude; 3) being emitted as the color associated with the third altitude; 4) blending between the colors associated with the second and third altitudes; or 5) illuminate at some other color. Since the DISCRETE FREEFALL MODE may be used to identify specific altitude ranges, it may be preferred for the visual display 20 to go dark (i.e., turn off) within any gap between altitude ranges, or illuminate some color not specifically defined with an altitude range, such as being illuminated as white light. This preference may be made by the user and programmed into the control unit 14, or alternatively, the control unit 14 may have a default setting which executes one of the aforementioned options.

Calculations regarding the change of the color may be calculated as described above, wherein a wavelength (or hue) differential is calculated along with an altitude differential, and the color change being equal to the wavelength differential divided by the altitude differential.

In the above described operational modes, the user may program an exit altitude into the control unit 14. This may be the highest altitude programmed into the control unit 14. However, it is contemplated that in other embodiments, the exit altitude is automatically determined by detecting a rapid change in altitude, which may be associated with the skydiver exiting an aircraft, or jumping from another elevated structure. When the exit altitude is automatically determined, the skydiver may select a lower altitude, as well as a first color associated with the exit altitude and a second color associated with the lower altitude. Therefore, when the exit altitude is detected, the microcontroller can determine the altitude range, as being equal to the difference between the detected exit altitude and the lower altitude, and calibrate the selected color range defined by the first and second colors to the altitude range.

The altitude display device 10 may also be operable in a CANOPY MODE, which provides a visual alert once the parachute is deployed and the user is more gently falling toward a landing zone. In the CANOPY MODE, the microcontroller 22 may automatically detect a rapid decrease in speed (e.g., derived from a smaller altitude decrease over a given period of time), which is an indication that the parachute has deployed. The transition from the CONTINUOS FREEFALL ALERT MODE or DISCRETE FREEFALL ALERT MODE to the CANOPY MODE may be implemented automatically by the microcontroller 22, independent of any user input. The altitude at which the rapid decrease in speed is detected may be referred to as a deployment altitude, which defines a canopy altitude range. The user may select colors associated with the deployment altitude, and the landing altitude, such that the microcontroller calibrates the selected color range with the deployment altitude. Thus, as the user gently falls with the parachute deployed, the visual display 20 may continuously transition the emitted color along the selected color range.

In any of the modes associated with a change in altitude, the altitude display device 10 may be programmed to generate a flashing signal at a particular altitude. The particular altitude associated with the flashing signal may be an altitude that a skydiver should track away from a group, or the skydiver is nearing the ground.

Although the foregoing describes the visual display 20 as providing a visual alert corresponding to a change in altitude, it is contemplated that in another operational mode, the visual display 20 may provide a visual alert corresponding to the vertical descent speed of the user. Being able to approximate speed while skydiving may be useful during an angle track jump, wherein a skydiver tries to identify how his vertical descent speed may change in response to a change in the angle of his track. The vertical descent speed may be calculated by the microcontroller 22 by dividing a change in altitude by a change in time. As such, the microcontroller 22 may be in communication with a timing circuit to provide the time data necessary to make such calculations.

The user may be able to program the control unit 14 to operate the visual display 20 such that the visual display 20 transitions or blends the emitted color within a defined color spectrum. Along these lines, the user may select an upper speed and a first color associated with the upper speed, and a lower speed and a second color associated with the lower speed. As such, as the speed varies between the upper speed and the lower speed, the visual display 20 continuously transitions between the first speed and the second speed.

Programming of the microcontroller 22 may also allow the user to select whether the visual display signal is associated with the speed, or altitude. In one particular, embodiment, the microcontroller 22 may be programmed such that the visual display 20 depicts a signal associated with speed within a first altitude range, and then the visual display 20 depicts a signal associated with altitude within a second altitude range. For instance, at the beginning of a jump, the user may be interested in receiving speed information, and thus, the visual display 20 may be associated with the speed of the skydiver. However, once a certain altitude threshold is crossed, the microcontroller 22 may automatically transition to associating the visual display 20 with altitude. The user may select the colors associated with speed and altitude, such that a change in the color spectrum will alert the user that the defined altitude threshold has been crossed. For instance, the color spectrum associated with speed may vary from yellow to orange, whereas the color spectrum associated with altitude may vary from purple to blue. Thus, when the visual display 20 transitions from orange to purple, the user will know the defined altitude threshold has been crossed.

It is contemplated that the control unit 14 may include a memory circuit 37 for storing data generated during use. For instance, altitude data generated by the altimeter 24 may be stored in the memory circuit 37. The selected color range(s) may also be stored in the memory circuit 37, along with their respective altitude range(s). Furthermore, the user's speed during the jump may also be stored in the memory circuit 37. The data stored in the memory circuit 37 may be stored for a number of jumps. A user may access the data stored in the memory circuit 37 through the wireless circuit 28 or through another data access port that may be formed on the control unit 14.

In addition to being mountable on a helmet 12, as shown in FIG. 1, it is also contemplated that in other embodiments, the visual display 20 may be integrated with the control unit 14 into a single unit which may be chest-mounted or wrist-mounted. Such a single unit may or may not include an additional numeric display of altitude. Along these lines, a chest-mounted altitude display device may be preferred for someone performing a skydive wearing a wingsuit. In a single integrated unit, the visual display may include a light strip, wherein a change in altitude may not also result in a change in color emitted by the visual display, the change in altitude may also change the position of the light emitted on the light strip. For instance, the highest altitude may be associated with one end of the strip, while the lowest altitude may be associated with the other end of the strip, and the emitted light signal may continuously travel from one end of the strip to the other throughout the skydive. Furthermore, it is also contemplated that the altitude display device 10, or various components thereof, such as the control unit or the display unit may be mounted or integrated directly into the helmet or other headwear worn by the user, such as goggles.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An altitude display device for use when skydiving, the device emitting a first color at a start freefall altitude and a second color at a parachute deployment altitude, the altitude display device comprising:
   an altimeter operative to determine an altitude of the altimeter and to generate an altitude signal representative of the determined altitude at a sampling rate so that a color of a visual display imperceptibly changes relative to a person's eye; and
   the visual display operative to emit a prescribed color range corresponding to the start freefall altitude to the parachute deployment altitude, the visual display in operative communication with the altimeter to receive the generated altitude signal, the visual display emitting a visual display signal at a refresh rate that a change in color emitted by the visual display signal is imperceptible to the person's eye and as the change in color corresponds to the generated altitude signal, wherein the prescribed color range comprises colors continuously blending from the first color associated with the start freefall altitude to the second color associated with the parachute deployment altitude;
   the visual display signal being variable in color within the prescribed color range associated with the prescribed altitude range, such that a change of altitude within the prescribed altitude range, as determined by the altimeter, correlates to the change of color of the visual display signal emitted by the visual display within the prescribed color range.

2. The altitude display device recited in claim 1, further comprising a shaft connected to the visual display and connectable to a helmet wearable by the person.

3. The altitude display device recited in claim 2, wherein the shaft is flexible.

4. The altitude display device recited in claim 2, wherein the visual display is positioned adjacent an end of the shaft.

5. The altitude display device recited in claim 1, wherein the visual display includes at least one light emitting diode capable of emitting the prescribed color range.

6. The altitude display device recited in claim 1, wherein the visual display emits the visual display signal at the refresh rate greater than 30 Hz.

7. The altitude display device recited in claim 1, further comprising a microcontroller in operative communication with the altimeter and the visual display, the microcontroller receiving the altitude signal from the altimeter and generate command signals for visual display based on the received altitude signal.

8. The altitude display device recited in claim 7, further comprising a wireless circuit in communication with the microcontroller to facilitate wireless communication with a remote electronic device.

9. The altitude display device recited in claim 7, wherein the microcontroller is operative to define at least one end of the prescribed altitude range based on a change in altitude as determined by the altimeter.

10. The altitude display device recited in claim 1, wherein the visual display signal being emitted at a first frequency when the determined altitude is above the parachute deployment altitude, the visual display signal being emitted at a second frequency lower than the first frequency when the determined altitude is below the parachute deployment altitude.

11. The altitude display device recited in claim 1, wherein the visual display is operable in a first mode to generate the visual display signal having a color representative of the altitude signal, and in a second mode to generate the visual display signal having a color representative of a vertical descent speed.

12. A method of displaying altitude information to a person when skydiving, the method comprising the steps of:
   determining an altitude using an altimeter of an altitude display device associated with the person;
   generating an altitude signal by the altimeter, the altitude signal being representative of the determined altitude, wherein the altitude signal is generated at a sampling rate such that a color change of a visual display of the altitude display device imperceptibly changes relative to the person's eye;
   emitting a visual display signal by the visual display at a refresh rate so that a change in color of the visual display signal is imperceptible to the person's eye, the visual display signal having a color representative of the altitude signal; and
   varying the color of the visual display signal within the prescribed color range associated with a prescribed altitude range from a start freefall altitude to a parachute deployment altitude, such that a change of altitude within the prescribed altitude range, as determined by the altimeter, correlates to the change of color of the visual display signal emitted by the visual display within the prescribed color range wherein the prescribed color range wherein the prescribed color range comprises colors continuously blending from a first color associated with the start freefall altitude toward to a second color associated with the parachute deployment altitude.

13. The method recited in claim 12, wherein the visual display signal is generated adjacent an end of a shaft connected to a helmet wearable by the person.

14. The method recited in claim 12, wherein the visual display signal is generated by a light emitting diode capable of emitting the prescribed color.

15. The method recited in claim 12, wherein the visual display signal is emitted by the visual display at the refresh rate greater than 30 Hz.

16. The method recited in claim 12, further comprising the steps of: receiving the altitude signal from the altimeter at a microcontroller; and generating, by the microcontroller, command signals for the visual display based on the received altitude signal.

17. The method recited in claim 12, further comprising the step of emitting the visual display signal by the visual display at a first frequency when the determined altitude is above the parachute deployment altitude, and emitting the visual display signal by the visual display at a second frequency lower than the first frequency when the determined altitude is below the parachute deployment altitude.

* * * * *